United States Patent
Sayyarrodsari et al.

(10) Patent No.: US 9,448,546 B2
(45) Date of Patent: Sep. 20, 2016

(54) DETERMINISTIC OPTIMIZATION BASED CONTROL SYSTEM AND METHOD FOR LINEAR AND NON-LINEAR SYSTEMS

(71) Applicant: ROCKWELL AUTOMATION TECHNOLOGIES, INC., Mayfield Heights, OH (US)

(72) Inventors: Bijan Sayyarrodsari, Austin, TX (US); Jan Kolinsky, Prauge (CZ); Jiri Hanzlik, Prague (CZ); Petr Horacek, Prague (CZ); Kadir Liano, Pflugerville, TX (US)

(73) Assignee: Rockwell Automation Technologies, Inc., Milwaukee, WI (US)

( * ) Notice: Subject to any disclaimer, the term of this patent is extended or adjusted under 35 U.S.C. 154(b) by 795 days.

(21) Appl. No.: 13/838,315

(22) Filed: Mar. 15, 2013

(65) Prior Publication Data

US 2014/0277601 A1    Sep. 18, 2014

(51) Int. Cl.
*G05B 13/02*    (2006.01)
*G05B 13/04*    (2006.01)

(52) U.S. Cl.
CPC ................................ *G05B 13/047* (2013.01)

(58) Field of Classification Search
CPC .................................................. G05B 13/047
USPC ............................................................ 700/29
See application file for complete search history.

(56) References Cited

U.S. PATENT DOCUMENTS

| | | | |
|---|---|---|---|
| 6,381,504 B1 | 4/2002 | Havener et al. | |
| 7,050,863 B2 | 5/2006 | Mehta et al. | |
| 7,376,472 B2 | 5/2008 | Wojsznis et al. | |
| 2003/0220772 A1 | 11/2003 | Chiang et al. | |
| 2004/0049295 A1 | 3/2004 | Blevins et al. | |
| 2005/0187643 A1* | 8/2005 | Sayyar-Rodsari et al. | 700/29 |
| 2006/0111881 A1 | 5/2006 | Jackson | |
| 2006/0282177 A1 | 12/2006 | Fuller et al. | |
| 2007/0078529 A1* | 4/2007 | Thiele et al. | 700/29 |
| 2007/0156259 A1 | 7/2007 | Baramov et al. | |
| 2009/0150890 A1* | 6/2009 | Yourst | 718/102 |
| 2009/0240480 A1 | 9/2009 | Baramov | |

(Continued)

FOREIGN PATENT DOCUMENTS

| | | |
|---|---|---|
| EP | 1426840 A1 | 6/2004 |
| EP | 2320283 A1 | 5/2011 |

OTHER PUBLICATIONS

Daniel Axehill "Applications of Integer Quadratic Programming in Control and Communication", Linköping Studies in Science and Technology Thesis No. 1218, 2005.*

(Continued)

*Primary Examiner* — Mohammad Ali
*Assistant Examiner* — Yuhui R Pan
(74) *Attorney, Agent, or Firm* — Fletcher Yoder, P.C.

(57) ABSTRACT

The embodiments described herein include one embodiment that provides a control method including determining a linear approximation of a pre-determined non-linear model of a process to be controlled, determining a convex approximation of the nonlinear constraint set, determining an initial stabilizing feasible control trajectory for a plurality of sample periods of a control trajectory, executing an optimization-based control algorithm to improve the initial stabilizing feasible control trajectory for a plurality of sample periods of a control trajectory, and controlling the controlled process by application.

18 Claims, 3 Drawing Sheets

(56) References Cited

U.S. PATENT DOCUMENTS

2009/0319059 A1 12/2009 Renfro et al.
2010/0100248 A1* 4/2010 Minto et al. .................. 700/287

OTHER PUBLICATIONS

Bemporad, et al.; Ultra-Fast Stabilizing Model Predictive Control via Canonical Piecewise Affine Approximations. IEEE, 2011.
Rossiter; Model-Based Predictive Control: A Practical Approach. CRC Press, 2003.
Goldfarb, et al.; A Numerically Stable Dual Method for Solving Strictly Convex Quadratic Programs. Mathematical Programming 27, North-Holland, 1983, pp. 1-33.
Goldfarb; Efficient Primal Algorithms for Strictly Convex Quadratic Programs. Lecture Notes in Mathematics 1230, Springer-Verlag, Berlin, 1986, pp. 11-25.
Wills, et al.; Fast Linear Model Predictive Control via Custom Integrated Circuit Architecture. IEEE Transactions on Control Systems Technology, vol. 20, No. 1, 2012, pp. 50-71.
Wang, et al.; Fast Model Predictive Control Using Online Optimization. IEEE Transactions on Control Systems Technology, vol. 18, Issue 2, 2010, pp. 267-278.
Rawlings, et al.; Model Predictive Control: Theory and Design, Nob Hill Publishing, 2009.
Gill, et al.; Numerically Stable Methods for Quadratic Programming, Mathematical Programming 14, (1978).
Gill, et al.; A weighted Gram-Schmidt method for convex quadratic programming. Mathematical Programming vol. 30 No. 2, (1984).
Bartlett, et al.; QPSchur: A dual, active-set, Schur-complement method for large-scale and structured convex quadratic programming. Optim. Eng. 7, (2006).
Gill, et al.; A Schur complement method for sparse quadratic programming. In: Reliable Numerical Computation, Oxford University Press, pp. 113-138, (1990).
Anda; Self-Scaling Fast Plane Rotation Algorithms, Phd Thesis, University of Minnesota (1995).
Gonzalez, et al.; A stable model predictive control with zone control. J. Proc. Cont. 19 (2009) 110-122.
Rawlings, et al.; Unreachable Setpoints in Model Predictive Control. IEEE Transactions on Automatic Control, vol. 53, Issue 9, 2008, pp. 2209-2215.
Daniel Axehill: "Applications of Integer Quadratic Programming in Control and Communication", Linkoping Studies in Science and Technology Thesis No. 1218, Jan. 1, 2005 (pp. 1-130), URL:http://liu.diva-portal.org/smash/get/diva2:21239/FULTEXT01 [retried on Nov. 20, 2012], pp. 9-32.
Extended European Search Report from EP14160227.6 dated Jul. 16, 2014.
Extended European Search Report from EP14160334.0 dated May 30, 2014.
Extended European Search Report from EP14160228.4 dated Jul. 9, 2014.

\* cited by examiner

DETERMINISTIC OPTIMIZATION BASED CONTROL SYSTEM AND METHOD FOR LINEAR AND NON-LINEAR SYSTEMS

BACKGROUND

The invention relates generally to control systems and more particularly to deterministic optimization based control of systems.

Generally, control system, such as an industrial plant or a power generation system, may be dynamic and include various constraints. For example, the constraints on the control system may be the result of actuator limits, operational constraints, economical restrictions, and/or safety restrictions. Accordingly, control of such a multivariable constrained dynamic system may be complex. Techniques such as coupled multi-loop proportional-integral-derivative (PID) controllers may not be best suited for handling the control of such complex control systems. On the other hand, one process control technique capable of handling the multivariable constraints is optimization based control (OBC). Specifically, OBC may improve the performance of the control system by enabling the system to operate closer to the various constraints (i.e., via dynamic optimization).

However, OBC may be computationally demanding because the dynamic optimization calculation may involve solving a constrained optimization problem such as quadratic programming (QP) problems at each sampling time. Utilizing a general solver may take seconds or even minutes. In addition, it may be difficult to predict the time it takes for the optimizer to solve the constrained optimization problems. Accordingly, to utilize OBC to control systems with faster dynamics, it may often be beneficial to enable deterministic OBC to provide a feasible control action within a predetermined control time.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a control method including determining a linear approximation of a pre-determined non-linear model of a process to be controlled, determining a convex approximation of the nonlinear constraint set, determining an initial stabilizing feasible control trajectory for a plurality of sample periods of a control trajectory, executing an optimization-based control algorithm to improve the initial stabilizing feasible control trajectory for a plurality of sample periods of a control trajectory, and controlling the controlled process by application of the feasible control trajectory within a predetermined time window.

A second embodiment provides a control method, including, based upon a predetermined change of state of a non-linear process to be controlled, determining a linearized model of the non-linear process, cyclically repeating execution of an optimization-based control algorithm to determine a feasible control trajectory for a plurality of sample periods of a control trajectory, and controlling the controlled process by application of the feasible control trajectory.

A third embodiment provides a control system, including memory circuitry for storing executable code, and processing circuitry for executing the code. The code defining steps that, when executed determines a linearized model of a non-linear process to be controlled, executes an optimization-based control algorithm to determine a feasible control trajectory for a plurality of sample periods of a control trajectory, and controls the controlled process by application of the feasible control trajectory.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
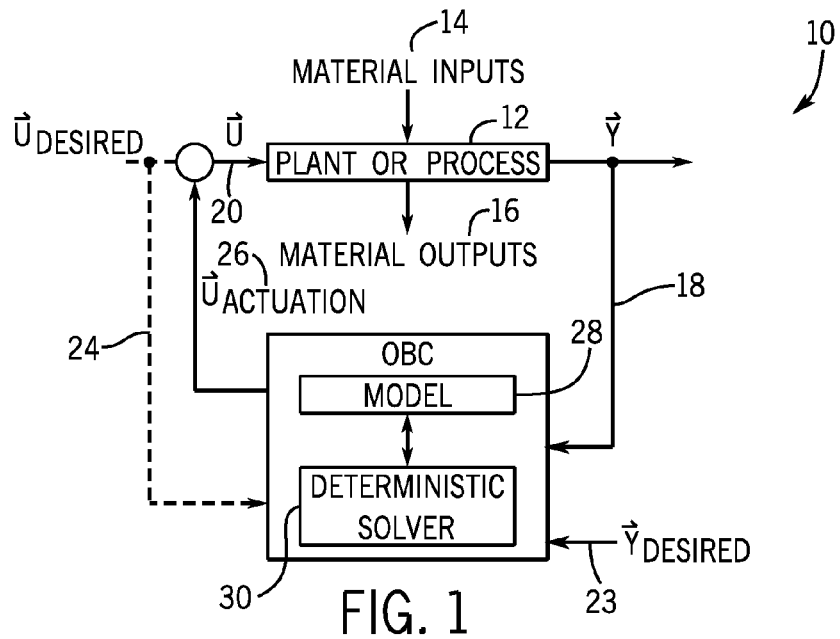
FIG. 1 depicts a block diagram of an embodiment of a control system utilizing deterministic optimization-based control (OBC)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed toward systems and methods for deterministic optimization-based control (OBC) of a control system, such as an industrial plant, a power generation system, or the like. Generally, control systems may utilize process control techniques to control the system. For example, some control systems utilize proportional-integral-derivative (PID) controllers coupled in a multi-loop configuration. Multi-loop PID controllers may offer a fast real-time control of a control system. In addition, PID controllers may run on embedded systems with less computational power. However, when control system has complex dynamics and/or its operation is constrained, the complexity of the process control may greatly increase and multi-loop PID controllers may not provide adequate control. For example, the control system may include processes with large dead times or non-minimum phase dynamics.

One process control technique for control of dynamic multivariable systems is optimization-based control (OBC), which can offer better control (e.g. reduces process variations to enable operation closer to constraints at more profitable operating points). Specifically, OBC uses a process model to predict future process output trajectories based on process input trajectories. In other words, OBC computes trajectories of manipulated variables to optimize the objective function (i.e., minimize costs). As used herein, the cost includes the determination of how well the output trajectories match the desired setpoints. It should be appreciated that in linear control systems, the cost may be captured as a quadratic programming (QP) problem. Accordingly, the dynamic optimization included in the OBC may be computationally complex and run on computer servers with general solvers, which may take seconds or even minutes to produce a solution. Thus, to include OBC on an embedded system for real-time process control, it may be beneficial to improve the efficiency of OBC while ensuring that it is stabilizing.

Accordingly, one embodiment provides a control method including determining a linear approximation of a pre-determined non-linear model of a process to be controlled, determining a convex approximation of the nonlinear constraint set, determining an initial stabilizing feasible control trajectory for a plurality of sample periods of a control trajectory, executing an optimization-based control algorithm to improve the initial stabilizing feasible control trajectory for a plurality of sample periods of a control trajectory, and controlling the controlled process by application of the feasible control trajectory within a predetermined time window. In other words, deterministic OBC may be utilized for real-time control of systems with fast dynamics by including a stabilization function to produce a stable feasible solution (i.e., a solution that does not increase the cost function) available for each predetermined sampling time.

By way of introduction, FIG. 1 depicts an embodiment of a control system 10 for a plant/process 12. Generally, the control system 10 may control the functioning of the plant/process 12, which may be an industrial manufacturing system, an automation system, a power generation system, a turbine system, or the like. Accordingly, as depicted, the control system 10 may control the plant/process 12 to transform material inputs 14 into material outputs 16. For example, the plant/process 12 may be a sugar crystallization process that transforms sugar syrup (i.e., material input 14) into sugar crystals (i.e., material output 16). In addition, the control system 10 may control the output variables (i.e., controlled variables) 18 by manipulating the input variables 20 (i.e., manipulated and disturbance variables). Going back to the sugar crystallization example, the control system 10 may manipulate a steam valve (i.e., manipulated variable) to control a temperature (i.e., controlled variable). In some embodiments, the material input can be a manipulated variable as well (for example a controller can control the feed rate for a material input to the plant).

To optimize the control of the plant/process 12, the control system 10 may further include optimization based control (OBC) 22 configured to find a stabilizing feasible solution for an optimization problem within a predetermined time window. In other words, the OBC 22 may determine feasible actions (i.e., solution) for the control system 10 to take. Specifically, the OBC 22 may be configured to determine a control trajectory 26 (i.e., a set of actions) over a control horizon (i.e., period of time to take the actions). Accordingly, the OBC 22 may sample the state of the plant/process 12 at specified sampling times. In some embodiments, the state of the plant/process 12 may include the previous output variables 18, a desired output trajectory 23, a desired control trajectory 24, or any combination thereof. Based on the sampled state of the plant/process 12, the OBC 22 may determine the control trajectory 26 (i.e., a feasible solution to the optimization problem) during the control time. As used herein, control time refers to the time during which the plant/process 12 is functioning, which may be in real-time. After the control trajectory 26 is determined by the OBC 22, in some embodiments, the control trajectory 26 is compared to the desired control trajectory 24 in a comparator 32 to determine the input variables 20 to the plant/process 12 (i.e., actions to be taken in the control system 10). Alternatively, the control trajectory 26 may be directly reflected in the input variables 20. It should be appreciated that the OBC 22 may be implemented on an embedded system, such as ControlLogix, available from available from Rockwell Automation, of Milwaukee, Wis.

To facilitate determining the control trajectory 26, as depicted, the OBC 22 includes a pre-determined model 28 and a deterministic solver 30. Specifically, the deterministic solver 30 may use a feasible search strategy, such as a primal active set method, to determine solutions to the constrained optimization problem. As will be described in more detail below, a feasible search strategy begins at a starting point within the feasible region of the control system 10 and moves around the feasible region to search for an optimum feasible solution (i.e., control trajectory with minimum cost). In other words, the deterministic solver 30 may determine various feasible actions (i.e., control trajectories) that may be taken by the control system 10. Based on the feasible solutions determined by the deterministic solver 30, the model 28 may be utilized to predict the behavior of the process/plant 12. In linear systems or non-linear systems with a linear approximation, the model 28 may be a linear model such as a state space model, a step or impulse response model, an autoregressive with exogenous terms (ARX) model, a transfer function model, or the like. As such, the OBC 22 may compare the cost of each feasible solution and select the control trajectory 26 with the lowest cost.

Ideally, the control trajectory 26 determined is the optimum solution with the lowest cost associated, but, as described above, the optimization calculation may be complex. Accordingly, as will be described in further detail below in the Detailed Example section, the techniques described herein aim to increase the efficiency of the dynamic optimization calculation. For example, the techniques described herein may modify an objective (i.e., cost) function to define the control system 10 constraints with simple bounds. Thus, the dynamic optimization computation may be greatly reduced and executed on an embedded system because many dynamic optimization solvers (e.g., quadratic-programming (QP) solvers) more efficiently handle simple bounds compared to complex constraints.

Although the dynamic optimization may be efficiently configured, the OBC 22 may not always find the optimum (i.e., lowest cost) control trajectory 26 during each control time. However, in practice, a stable sub-optimal control trajectory 26 may be sufficient. As used herein, the control trajectory 26 is stabilizing when the cost does not increase compared to the previous step by taking the actions.

Figure 2:
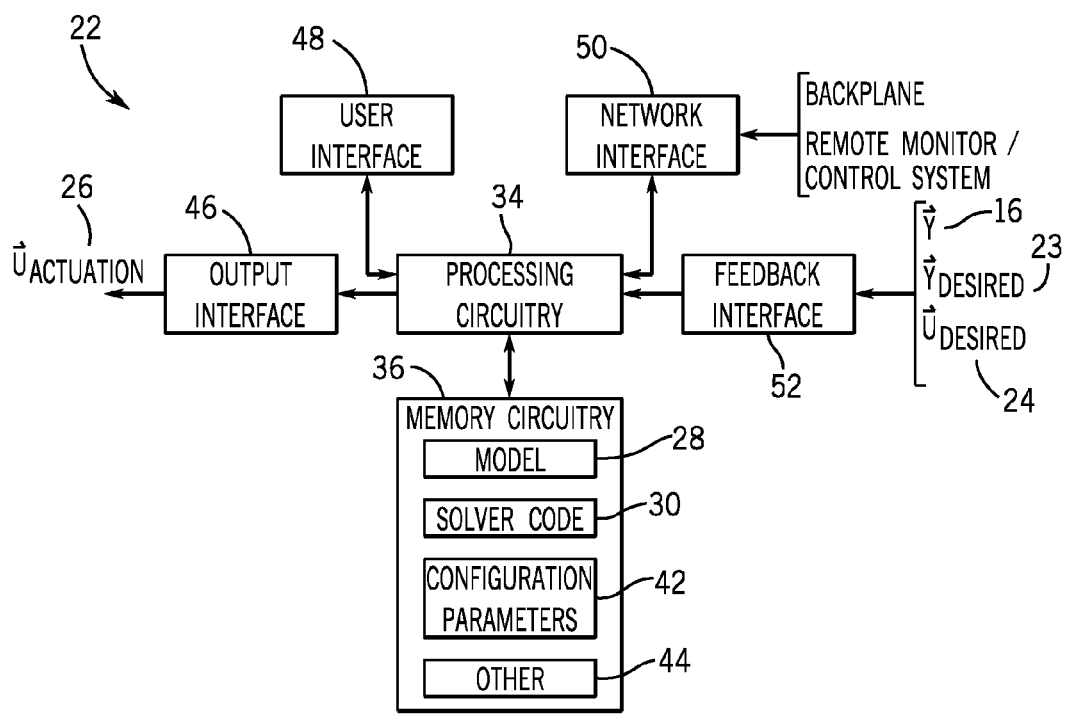
FIG. 2 depicts a block diagram of an embodiment of the deterministic optimization-based control from FIG. 1.
Figure 3:
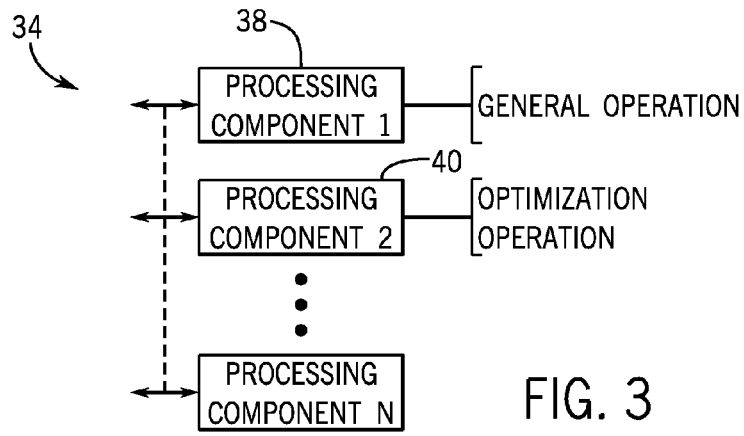
FIG. 3 depicts a block diagram of an embodiment of the processing circuitry from FIG. 2.

To facilitate the functions described herein, it should be appreciated that the OBC 22 may include a processor, useful for executing computing instructions (i.e., steps), and memory, useful for storing computer instructions (i.e., code) and/or data. As depicted in FIG. 2, the OBC 22 may implement the processor through processing circuitry 34 and the memory through memory circuitry 36. More specifically, the processing circuitry 34 may be configured to handle the general functionality of the control system, such as controlling actuators, as well as the functions of OBC 22, such as dynamic optimization. In addition, as depicted in FIG. 3, the processing circuitry 34 may include multiple processing components (e.g., parallel processor cores or separate processor modules), which may enable the processing circuitry 34 to better manage various functions. For example, as depicted, a first processing component 38 may perform the general operations of the control system 10. The general operations of the control system 10 may include controlling components of the control system 10, performing calculations, and the like. As for the OBC 22 functions, the computationally intensive dynamic optimization may be performed on the second processing component 40. Accordingly, this enables the dynamic optimization to be called from the first processing component 38 and executed synchronously or asynchronously on the second processing component 40, which may improve the efficiency of the optimization calculation. Alternatively, it should be appreciated that the dynamic optimization may be performed on the first processing core 38 along with the general functions of the control system 10. Furthermore, as depicted, the processing circuitry 34 includes N processing components, which may each be configured to handle different functions, such as calculating a linear approximation, of the control system 10.

Turning back to FIG. 2, the memory circuit 36 may store computer instructions (i.e., code) describing the model 28, the deterministic solver 30, configuration parameters 42, as well as other instructions 44, such as computing virtual measurements for unmeasured process variables for the general functioning of the control system 10. Specifically, the instructions stored in the memory circuit may be configured to guide the functioning of the model 28 and the deterministic solver 30. Accordingly, the memory circuitry 36 is communicatively coupled to the processing circuitry 34 to enable to processing circuitry 36 to read and/or execute the instructions (i.e., steps).

Figure 4:
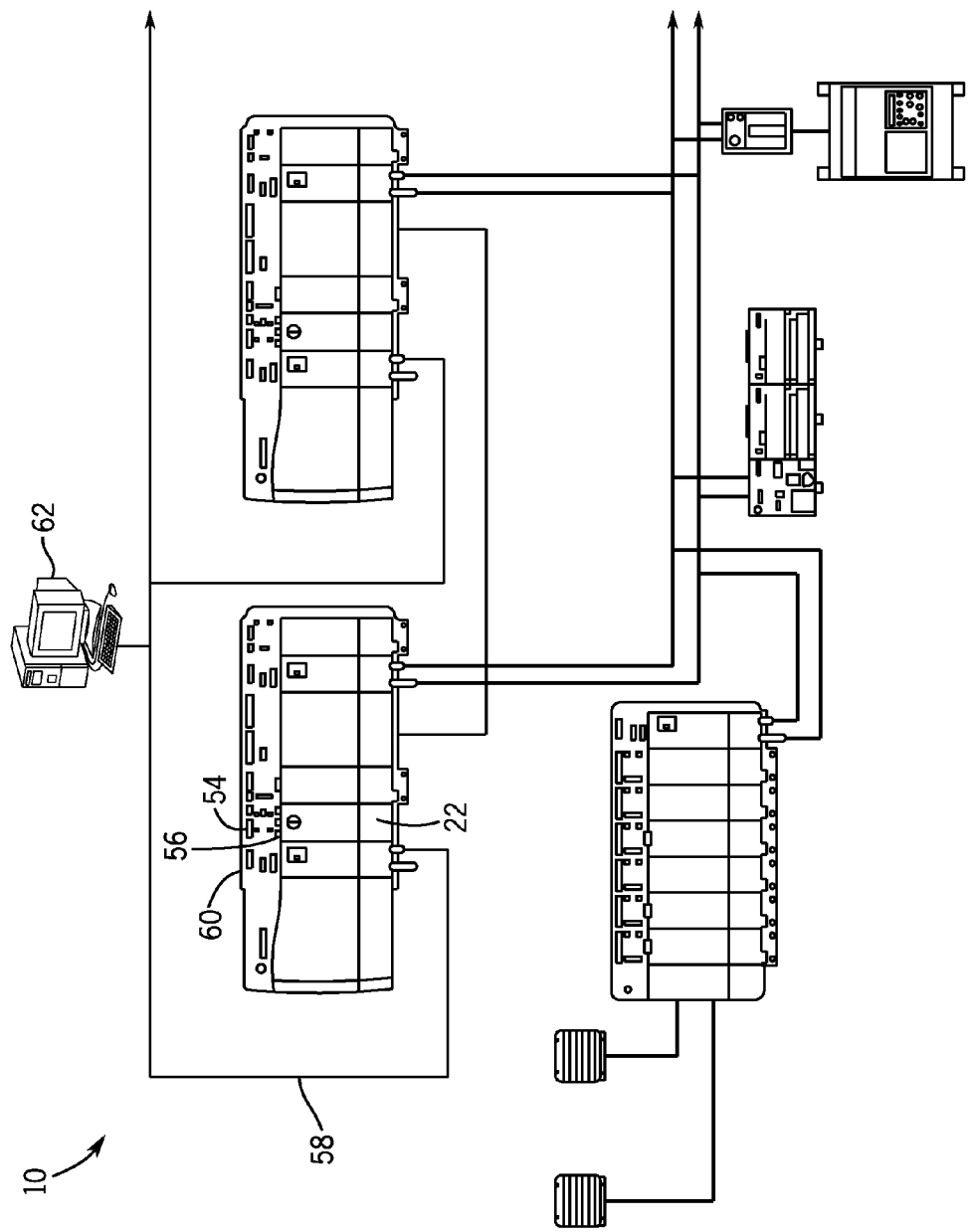
FIG. 4 depicts an embodiment of a deterministic OBC module communicatively coupled to other modules within the control system.

Furthermore, the depicted embodiment of the OBC 22 further includes an output interface 46, a user interface 48, a network interface 50, and a feedback interface 52. Specifically, the user interface 48 may be configured to enable a user to communicate with the OBC 22. For example, as depicted in FIG. 4, the user interface 48 may include a graphical-user-interface (GUI) 54 configured to display metrics of the OBC 22, such as the control trajectory 26 determined. In addition, the user interface 48 may include buttons 56, which enable the user to input commands to the OBC 22. Similar to the user interface 48, the network interface 50 may enable a user to communicate with the OBC 22 over a network 58, such as a wide-area-network (WAN). In some embodiments, the network 58 may be a EtherNet/IP Network or a ControlNet Network, available from Rockwell Automation, of Milwaukee, Wis. More specifically, as depicted in FIG. 4, the network interface 50 may be communicatively coupled to the network 58 via a communication module 60. Alternatively, the network interface 50 may be communicatively coupled directly the network 58 through the backplane of the OBC 22. Furthermore, as depicted, the network 58 may be communicatively coupled to a remote monitoring/control system 62, such as a supervisory control and data acquisition (SCADA), to enable the user to remotely communicate with the OBC 22. Accordingly, as depicted in FIG. 2, both the user interface 48 and the network interface 50 are communicatively coupled to the processing circuitry 34 to enable user commands to be communicated to the processing circuitry 34 and information concerning the OBC 22 to be communicated to the user. Note that each module in memory circuitry 36 may be configured such that it can respond as a server responding to the queries from various interfaces. For example, the model module 28 can be queried by the user interface to report its fidelity. In addition the model module 28 may be called by solver code module 30 to determine the optimal control trajectory.

Turning back to FIG. 2, as described above, the OBC 22 may be configured determine stabilizing feasible control trajectories for the control system 10 based on feedback from the plant/process 12. As such, the feedback interface 52 may be configured to receive feedback, such as the previous output variables 18, the desired output trajectory 23, the desired control trajectory 24, or any combination thereof, and communicate it to the processing circuitry 34. For example, the feedback interface 52 may be a serial port located on the backplane of the OBC 22, which enables the OBC 22 to receive samples from sensors in the control system 10. After the processing circuitry 34 determines a control trajectory 26, the control trajectory 26 is communicated to the output interface 46. As will be described in more detail below, the processing circuitry 34 may utilize various search functions (e.g., QP solvers) and stabilization functions to determine the control trajectory 26. Thus, the output interface 46 may be configured to transmit the control trajectory 26 to the plant/process 12. Similar to the feedback interface 52, the output interface 46 may be a serial port located on the backplane of the OBC 22 to enable the output interface to communicate with a controller controlling inputs into the plant/process 12. It should be appreciated that as described above, the controller may be the same processing component, a different core of a processor, or a different processor module.

Figure 5:
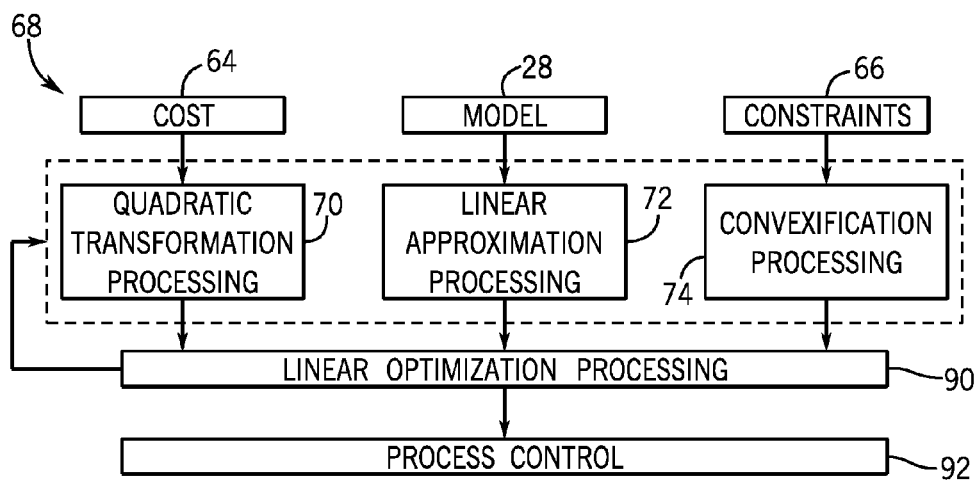
FIG. 5 depicts a flow chart of an embodiment of deterministic optimization control of the control system depicted in FIG. 1.

As described above, the OBC 22 may be configured to perform dynamic optimization of the plant/process 12. When the plant/process 12 can be modeled with a linear model, techniques may be used to perform deterministic optimization based control of the plant/process 12. For example, two such techniques are described in U.S. patent application Ser. No. 13/837,297 entitled "Stabilized Deterministic Optimization Based Control System and Method," filed by Kolinsky et al. on Mar. 15, 2013, and in U.S. application Ser. No. 13/836,701 entitled "Sequential Deterministic Optimization Based Control System and Method," filed by Kolinsky et al. on Mar. 15, 2013, which are hereby incorporated into the present disclosure by reference. Accordingly, to utilize these techniques, it may be beneficial to adjust a non-linear model of a plant/process 12. More specifically, as depicted in FIG. 5, this may include adjusting a cost (i.e., objective) function 64, the model 28, and a constraint model 66. Accordingly, FIG. 5 depicts a deterministic optimization based control process 68 for most control system 10, including ones with non-linear plants/process 12 (i.e., a non-linear model of the plant/process 12). As used herein, the cost function 64 may be configured to facilitate finding the optimal control trajectory of the plant/process 12 based on input variables 20 and output variables 18. In addition, the model 28, as used herein, may be configured to predict the behavior of the plant/process 12 based on the sum of responses to future inputs, past inputs, disturbances, and/or initial conditions. Furthermore, as used herein, the constraint model 64 models technological restrictions, economical restrictions, and/or safety restrictions.

As depicted, the cost function 64 undergoes a quadratic transformation processing (process block 70). For example, the quadratic transformation processing 70 may include transforming the cost function 64 into the following form:

$$J_y = \sum_{j=1}^{n_y} (y_j - y_j^t)^T W_j (y_j - y_j^t) + \sum_{n=1}^{n_u} \Delta u_n^T B_n \Delta u_n + \sum_{n=1}^{n_u} (u_n - u_n^t)^T V_n (u_n - u_n^t) \quad (1)$$

$W_j$, $B_n$, $V_n$—positive semidefinite weight matrices (tuning parameters)
$y_j^t = [y_j^t(t+1), y_j^t(t+2), \ldots, y_j^t(t+p)]^T$—input target trajectory
$u_n^t = [u_n^t(t+1), u_n^t(t+2), \ldots, u_n^t(t+p)]^T$—output target trajectory Next, the process 68 may calculate a linear approximation of the model 28, which may be based upon a predetermined change of state. For example, the linear approximation may include approximating the plant/process 12 to the following form:

$$y = A_u \Delta u + y_{free} \quad (2)$$

$\Delta u = [(\Delta u_1)^T, (\Delta u_2)^T, \ldots, (\Delta u_{n_u})^T]^T$—future changes of all inputs arranged in a vector
$\Delta u_n = [\Delta u_n(t), \Delta u_n(t+1), \ldots, \Delta u_n(t+n_c-1)]^T$—future changes of n-th input
$y = [(y_1)^T, (y_2)^T, \ldots, (y_{n_y})^T]^T$—all predicted output trajectories arranged in a vector
$y_j = [y_j(t+1), \ldots, y_j(t+p)]^T$—predicted trajectory of j-th output
$y_{free} = [(y^1_{free})^T, (y^2_{free})^T, \ldots, (y^{n_y}_{free})^T]^T$—all free response trajectories arranged in a vector
$y_{free}^j = [y_{free}^j(t+1), \ldots, y_{free}^j(t+p)]^T$—free response trajectory of j-th output
$y_j = A_{uj} \Delta u + y_{free}^j$
$A_{uj} = [A_{uj}^1, A_{uj}^2, \ldots, A_{uj}^{n_u}]$—prediction matrix of j-th output
$A_u = [A_{u1}^T, A_{u2}^T, \ldots, A_{un_y}^T]^T$—prediction matrix
$n_u$—number of inputs
$n_y$—number of outputs
$n_c$—control horizon
p—prediction horizon
$N = n_c$—number of control moves In some embodiments, a Parametric Universal Nonlinear Dynamics Approximator (PUNDA) linear approximation model may be used. Generally, the PUNDA includes a dynamic parameterized model operable to model a nonlinear plant/process 12. The dynamic parameterized model receives one or more parameters that are outputs of an explicit mapping to a parameter space. The parametric universal nonlinear dynamic approximator also includes a nonlinear approximator operable to explicitly model dependencies of the one or more parameters of the dynamic parameterized model upon operating conditions of the nonlinear process. The PUNDA is operable to predict process outputs useful for predictive control and optimization of the nonlinear process, in which actual measurements of at least one of the process outputs do not exist. More specifically, the PUNDA operates the nonlinear approximator to receive one or more process operating conditions, including one or more process inputs, to generate values for the one or more parameters of the dynamic parameterized model based on the process operating conditions, and to provide the values for the one or more parameters to the dynamic parameterized model. In addition, the PUNDA operates the dynamic parameterized model to receive the values of the one or more parameters from the nonlinear approximator, to receive the one or more process inputs, to generate one or more predicted process outputs based on the received values of the one or more parameters and the received one or more process inputs, and to store the one or more predicted process outputs. For a more detailed description of the PUNDA model, see application no. 2005/0187643 A1 entitled "Parametric Universal Nonlinear Dynamics Approximator and Use," filed by Sayyar-Rodsari et al. on May 10, 2004, which is hereby incorporated into the present disclosure by reference.

Figure 6:
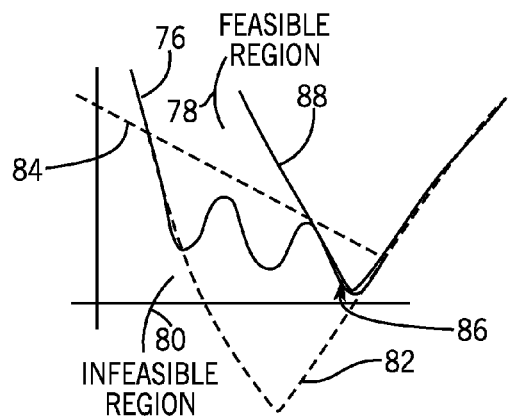
FIG. 6 depicts an embodiment of a covexification process described in FIG. 5.

In addition, as described above, the process 68 may convexify the constraint model 66 to efficiently simplify complex constraints. An example of this may be seen in FIG. 6. In FIG. 6, curve 76 represents a complex constraint separating a feasible region 78 and an infeasible region 80. As should be appreciated, calculations based a complex constraint, such as the one depicted by curve 76, may be difficult. Accordingly, it may be beneficial to simplify calculations by making a convex approximation of constraint curve 76. As depicted, various convex approximations may be made on the constraint curve 72, namely curve 82, 84, and 86. Specifically, curve 82 appears to include the majority, if not all, of the feasible region 78; however, it may not be a good convex approximation because it includes a substantial amount of the infeasible region 80. Accordingly, curve 82 may be classified as an over convexification. Similarly, curve 84 also a substantial amount of the infeasible region 80. In addition, curve 84 does not include the lowest point 86 in the feasible region 78, which is often an optimum solution. Accordingly, curve 84 may also be classified as an under convexification. Although curve 88 excludes a portion of the feasible region it may be the best convex approximation of the three because it includes the lowest point 86 and does not appear to include substantial amounts of the infeasible region 80.

Furthermore, as described above, various processes (i.e., functions) in the control system 10 may be handled on different computing components (e.g., 38 and 40). Specifically, it should be appreciated that the quadratic transformation 70, the linear approximation (e.g., PUNDA) 72, and convexification 74 may each be run on a different computing component. Accordingly, each process (i.e., 70, 72, and 74) may function synchronously or asynchronously. In other words, this gives computationally more complex calculations, such as the linear approximation 72, more time. For example, in some embodiments, the linear approximation 72 may calculated when a user requests it or when a trigger event occurs (i.e., a change in state) while the quadratic transformation 70 and the convexification 74 may be performed during each control time. A change in state may include a change in disturbances, a change in setpoints, or any combination thereof. Accordingly, the rest of process 68 may executed more frequently than the linear approximation process 72.

Turning back to FIG. 5, after desired adjustments (i.e., 70, 72, and 74), the process 68 may perform a linear dynamic optimization (process block 90). As described above, this may be either of the techniques incorporated herein by reference or any other linear optimization technique. For example, an infeasible search method (i.e., algorithm) such as a dual quadratic active set algorithm may be used. Alternatively, a feasible search method (i.e., algorithm) such as a primal active set solver algorithm may be used. Combining the two, an infeasible search algorithm may execute for a first portion of the control time and a feasible search algorithm may execute during a second portion if a feasible trajectory is not determined by the infeasible search algorithm.

Finally, based on the control trajectory determined by the linear dynamic optimization 90, the manipulated variables 20 into the plant/process 12 may be controlled (process block 92). In addition, as depicted, the control trajectory determined by the linear dynamic optimization 90 may be fed back to the quadratic transformation 70, the linear approximation (e.g., PUNDA) 72, and/or the convexification 74 in order to improve each process.

Generally, the above described techniques enable optimization based control for many control systems 10. More specifically, the OBC 22 is configured to adjust non-linear plants/processes 12 so that linear optimization based control techniques may be used to perform dynamic optimization. This may include providing a quadratic transformation for a non-quadratic cost function, a linear approximation (e.g., PUNDA) for a non-linear model, and a convex approximation for complex constraints.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling operation of an automation system, comprising:
   determining, using a control system, a first linear approximation of a non-linear model configured to model non-linear operation of the automation system;
   determining, using the control system, a first convex approximation of a nonlinear constraint on the operation of the automation system;
   performing, using the control system, a first quadratic transformation on an objective function;
   performing, using the control system, a first optimization search based at least in part on the first linear approximation, the first convex approximation, and the objective function after the first quadratic transformation is performed to determine a first feasible trajectory of a manipulated variable of the automation system over a plurality of sample periods in a first control horizon; and
   instructing, using the control system, the automation system to adjust the operation based at least in part on the first feasible trajectory of the manipulated variable;
   wherein determining the first convex approximation comprises:
   determining a second convex approximation of the nonlinear constraint;
   determining a third convex approximation of the nonlinear constraint;
   determining amount of an infeasible region that does not satisfy the nonlinear constraint included in the second convex approximation and the third convex approximation;
   determining amount of a feasible region that satisfies the nonlinear constraint included in the second convex approximation and the third convex approximation;
   setting the first convex approximation as the second convex approximation or the third convex approximation based at least in part on amount of the feasible region included in the second convex approximation, amount of the feasible region included in the third convex approximation, amount of the infeasible region included in the second convex approximation, and amount of the infeasible region included in the third convex approximation;
   wherein the first convex approximation comprises simple bounds.

2. The method of claim 1, wherein determining the first linear approximation comprises:
   determining a non-linear approximator configured to determine a model parameter based at least in part on a mapping of an input parameter of the automation system into a parameter space; and
   determining a dynamic parameterized model configured to model operation of the automation system based at least in part on the model parameter and the input parameter.

3. The method of claim 1, comprising:
   determining, using the control system, a second convex approximation of the nonlinear constraint during a first time step directly after a second time step in which the first convex approximation is determined, the first quadratic transformation is performed, and the first linear approximation is determined;
   performing, using the control system, a second quadratic transformation on the objective function during the first time step; and
   determining, using the control system, a second linear approximation of the non-linear model during a third time step multiple time steps after the second time step.

4. The method of claim 3, comprising:
   performing, using the control system, a second optimization search during the first time step based at least in part on the first linear approximation, the second convex approximation, and the objective function after the second quadratic transformation is performed to determine a second feasible trajectory of the manipulated variable over a second plurality of sample periods in a second control horizon after the first control horizon; and
   instructing, using the control system, the automation system to adjust operation based at least in part on the second feasible trajectory of the manipulated variable.

5. The method of claim 4, comprising:
   determining, using the control system, a third convex approximation of the nonlinear constraint during the third time step;
   performing, using the control system, a third quadratic transformation on the objective function during the third time step;
   performing, using the control system, a third optimization search during the third time step based at least in part on the second linear approximation, the third convex approximation, and the objective function after the first quadratic transformation is performed to determine a third feasible trajectory of the manipulated variable over a third plurality of sample periods in a third control horizon after the second control horizon; and
   instructing, using the control system, the automation system to adjust operation based at least in part on the third feasible trajectory of the manipulated variable.

6. The method of claim 1, wherein performing the first optimization search comprises performing an infeasible optimization search.

7. The method of claim 6, wherein performing the infeasible optimization search comprises executing a dual quadratic active set solver algorithm.

8. The method of claim 1, wherein performing the optimization search comprises performing a feasible optimization search by:
 determining a first point within a feasible region that satisfies the convex approximation of the nonlinear constraint;
 determining a second point within the feasible region; and
 setting the first feasible trajectory as the first point or the second point based at least in part on the objective function after the first quadratic transformation is performed.

9. The method of claim 8, wherein performing the feasible optimization search algorithm comprises executing a primal active set solver algorithm.

10. The method of claim 1, wherein performing the optimization search comprises:
 performing an infeasible optimization search during a first portion of a time step to determine a first trajectory of the manipulated variable;
 setting the first feasible trajectory to the first trajectory when the first trajectory satisfies each constraint on operation of the automation system; and
 when the first trajectory does not satisfy each constraint on operation of the automation system:
  performing a feasible optimization search during a second portion of the time step after the first portion to determine a second trajectory of the manipulated variable when the first trajectory does not satisfy each constraint on operation of the automation system; and
  setting the first feasible trajectory to the second trajectory.

11. The method of claim 1, wherein determining the first linear approximation comprises determining a linear relationship between trajectory of an output variable of the automation system over the first plurality of sample periods and trajectory of change of an input variable to the automation system over the first plurality of sample periods.

12. An automation system configured to, in operation, process material inputs into material outputs, comprising:
 a control system configured to:
 determine a linear approximation of a non-linear model, wherein the non-linear model is configured to model operation of the automation system;
 determine a first convex approximation of a nonlinear constraint on the operation of the automation system;
 perform a quadratic transformation on an objective function;
 perform an optimization search based at least in part on the linear approximation, the convex approximations, and the objective function after the first quadratic transformation is performed to determine a feasible control trajectory of a manipulated variable used to process the material inputs into the material outputs over a plurality of sample periods in a control horizon; and
 instruct the automation system to adjust the operation based at least in part on the feasible control trajectory of the manipulated variable;
 wherein to determine the first convex approximation comprises:

determine a second convex approximation of the nonlinear constraint;
 determine a third convex approximation of the nonlinear constraint;
 determine amount of an infeasible region that does not satisfy the nonlinear constraint included in the second convex approximation and the third convex approximation;
 determine amount of a feasible region that satisfies the nonlinear constraint included in the second convex approximation and the third convex approximation; and
 sett the first convex approximation as the second convex approximation or the third convex approximation based at least in part on amount of the feasible region included in the second convex approximation, amount of the feasible region included in the third convex approximation, amount of the infeasible region included in the second convex approximation, and amount of the infeasible region included in the third convex approximation;
 wherein the first convex approximation comprises simple bounds.

13. The automation system of claim 12, wherein the control system comprises a first processor and a second processors, wherein:
 the first processor is configured to determine the linear approximation, determine the convex approximations, and perform the optimization search; and
 the second processor is configured to:
  instruct the first processor to perform the optimization search; and
  instruct the automation system to adjust operation.

14. A tangible, non-transitory, computer-readable medium configured to store instructions executable by one or more processors in an automation system, wherein the instructions comprises instructions to:
 determine, using the one or more processors, a first linear approximation of a non-linear model configured to model non-linear operation of the automation system;
 determine, using the one or more processors, a first convex approximation of a nonlinear constraint on the operation of the automation system;
 perform, using the one or more processors, a first quadratic transformation on an objective function;
 determine, using the one or more processors, a first feasible trajectory of a manipulated variable of the automation system over a first plurality of sample periods by performing a first optimization search based at least in part on the first linear approximation, the first convex approximation, and the objective function after the first quadratic transformation is performed; and
 instruct, using the one or more processors, the automation system to adjust the operation based at least in part on the first feasible trajectory of the manipulated variable.
 wherein the instructions to determine the first convex approximation comprise instructions to:
 determine a second convex approximation of the nonlinear constraint;
 determine a third convex approximation of the nonlinear constraint;
 determine amount of an infeasible region that does not satisfy the nonlinear constraint included in the second convex approximation and the third convex approximation;

determine amount of a feasible region that satisfies the nonlinear constraint included in the second convex approximation and the third convex approximation; and sett the first convex approximation as the second convex approximation or the third convex approximation based at least in part on amount of the feasible region included in the second convex approximation, amount of the feasible region included in the third convex approximation, amount of the infeasible region included in the second convex approximation, and amount of the infeasible region included in the third convex approximation;

wherein the first convex approximation comprises simple bounds.

15. The computer-readable medium of claim 14, wherein the instructions to determine the first linear approximation comprise instructions to:

determine a non-linear approximator configured to determine a model parameter based at least in part on a mapping of the input parameter into a parameter space; and determine a parameterized model configured to model operation of the automation system based at least in part on the model parameter and the input parameter.

16. The computer-readable medium of claim 14, wherein the instructions to determine the linear approximation comprise instructions to determine a linear relationship between trajectory of an output variable of the automation system over the first plurality of sample periods and trajectory of change of an input variable to the automation system over the first plurality of sample periods.

17. The computer-readable medium of claim 14, comprising instructions to:

determine, using the one or more processors, a second convex approximation of the nonlinear constraint during a first time step directly after a second time step in which the first convex approximation is determined, the first quadratic transformation is performed, and the first linear approximation is determined;

perform, using the one or more processors, a second quadratic transformation of the objective function during the first time step; and determine, using the one or more processors, a second linear approximation of the non-linear model during a third time step multiple time steps after the second time step.

18. The computer-readable medium of claim 17, comprising instructions to:

determine, using the one or more processors, a second feasible trajectory of the manipulated variable over a second plurality of sample periods after the first plurality of sample periods by performing a second optimization search during the first time step based at least in part on the first linear approximation, the second convex approximation, and the objective function after the second quadratic transformation is performed; and instruct, using the one or processors, the automation system to adjust operation based at least in part on the second feasible trajectory of the manipulated variable.

* * * * *